(No Model.)

J. H. MAGRUDER.
CANDY PAN.

No. 403,683. Patented May 21 1889.

ATTEST —
Harry L. Amer.
E. Everett Ellis

INVENTOR —
John H. Magruder
By
H. C. McIntire
his Atty.

UNITED STATES PATENT OFFICE.

JOHN H. MAGRUDER, OF WASHINGTON, DISTRICT OF COLUMBIA.

CANDY-PAN.

SPECIFICATION forming part of Letters Patent No. 403,683, dated May 21, 1889.

Application filed December 13, 1888. Serial No. 293,420. (No model.)

*To all whom it may concern:*

Be it known that I, JOHN H. MAGRUDER, a citizen of the United States, residing at Washington, in the District of Columbia, have invented certain new and useful Improvements in Candy-Pans; and I do hereby declare the following to be a full, clear, and exact description of the invention, such as will enable others skilled in the art to which it appertains to make and use the same.

This invention relates to certain new and useful improvements in pans for the use of confectioners and others in retailing candies and similar goods; and it consists in a pan having one or more movable divisions or partitions, substantially as and for the purpose hereinafter to be more particularly described.

The object of the invention is to provide a pan for the use of confectioners and others in which two or more kinds of candies or other goods may be kept in a divided or separated condition, and also to enable the goods to be pushed up compactly as the supply thereof gradually diminishes or becomes low, all as will more fully hereinafter appear when taken in connection with the accompanying drawings, wherein—

Figure 1:
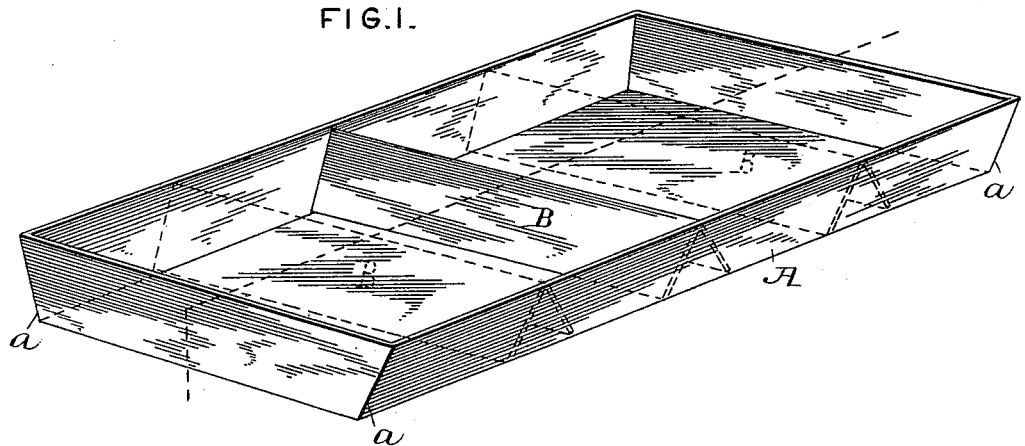
Figure 2:
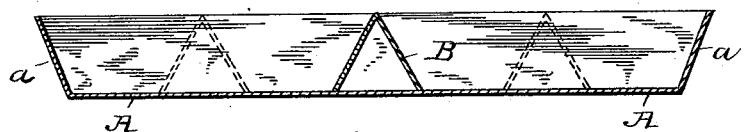
Figure 3:
Figure 4:
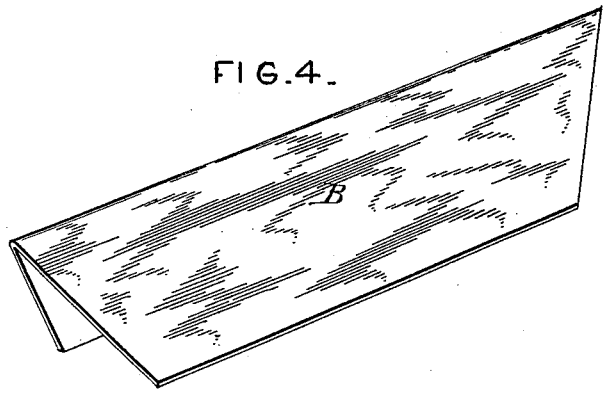

Figure 1 represents a perspective view of a pan having my improvements embodied in connection therewith, and Fig. 2 is a central longitudinal sectional view thereof. Fig. 3 is a view in perspective of the movable or sliding partition; and Fig. 4 is a view, partly in section, representing a modification.

In the use by confectioners and others of pans of this character it is desirable that the goods which they contain shall be kept together in compact form rather than appear scattered and spread, and inasmuch as the pans are being constantly dealt from, it is somewhat difficult to keep their contained goods gathered together except by constant attention. My invention is designed to accomplish this end, as will hereinafter appear.

In the practice of my invention I preferably employ a pan having slanting or inclined sides, and of any size or dimensions desired, and in said pan I locate or arrange one or more transverse partitions, the ends of which are beveled to conform to the sides of the pan. The said partitions are movable within the pan, and in order to enable them to stand in position without other support, I simply bend the same into ∧ shape, the lower edges of which rest on the bottom of the pan. Instead, however, of resorting to the use of a pan having slanting or inclined sides, I may use a pan having straight or vertical sides, in which event the ends of the sliding or movable partitions would be made straight correspondingly, instead of beveled, as in the preferred construction.

Reference being had to the several parts of the drawings by the letters marked thereon, A represents an ordinary pan for the use of confectioners and others in containing candies, fruits, and the like, the sides of which pan are preferably slanting or inclined, as shown at *a*.

Within the pan A, I locate or arrange one or more sliding or movable partitions, B, for dividing said pan into two or more compartments, in which separate or different kinds of goods or confections may be placed to be dealt from in retail selling thereof—say, for instance, in one compartment chocolate-drops may be kept, while another may contain gum-drops, it being desirable to keep the two separate or unmixed. As one or the other of these kinds are dealt out the partitions B may be moved in the manner represented by dotted lines, and the quantity of goods remaining on sale always kept together in compact form and fresh. As the partitions are gradually moved toward the ends of the pan a space will be left behind it, and which may be filled up and utilized by confections or goods of some other kind.

In the manufacture of pans of the character referred to it is usual to make or construct the same of some standard size, of which a stock is kept in hand for sale, although special sizes of said pans can be readily obtained to order; and it is obvious that the movable partitions of my invention can be made up in different sizes, in like manner as the pans, and that said partitions be supplied to the trade separate from the pans by simply furnishing the sizes desired.

In the drawings I have shown an obvious modification of my invention, wherein a pan having straight sides is resorted to, and in which instance the ends of the sliding or movable partition are to be correspondingly straight.

It is obvious that the partitions could be made up into many forms; but, as before stated, the construction herein shown is preferred as being most simple, the sole purpose of the invention being to have said partition movable within the pan and adapted to support itself in the positions to which it may be moved.

Having thus described my invention, what I claim as new, and desire to secure by Letters Patent, is—

A partition for pans bent into Λ shape to render the same self-supporting within the pan, substantially as described.

In testimony whereof I affix my signature in presence of two witnesses.

JOHN H. MAGRUDER.

Witnesses:
W. B. HOOVER,
GEORGE W. BAGG.